July 14, 1931.  T. SANMARTI  1,814,634
ELASTIC WHEEL
Filed Feb. 29, 1928
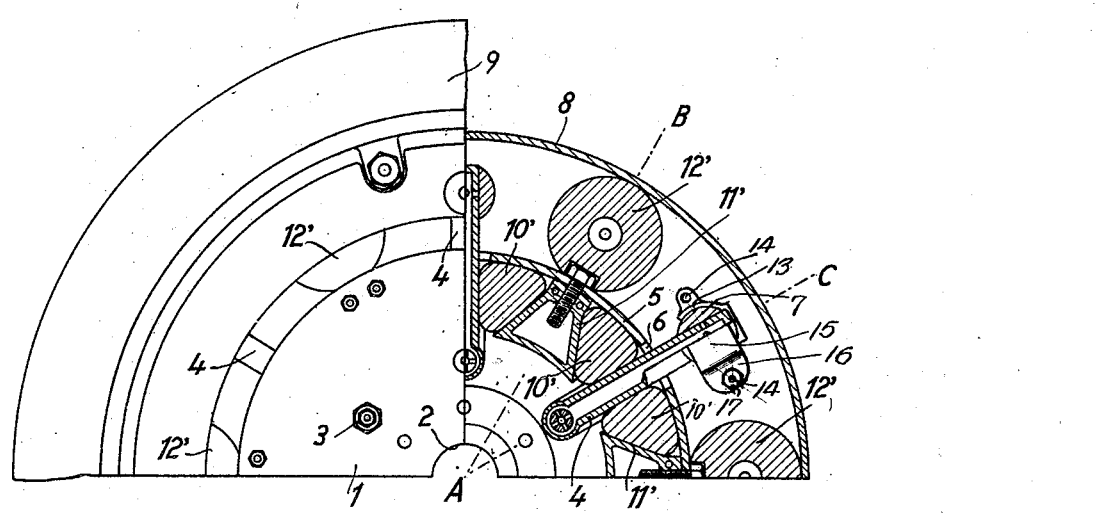
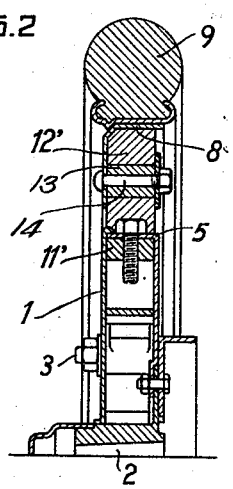 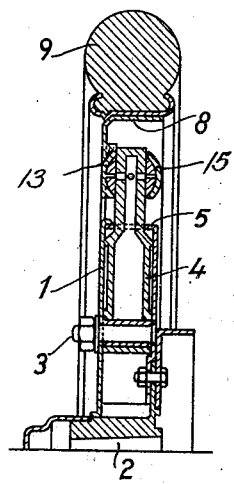
Inventor
T. Sanmarti
by
Attorney.

Patented July 14, 1931

1,814,634

UNITED STATES PATENT OFFICE

TEODORO SANMARTI, OF SABADELL, BARCELONA, SPAIN

ELASTIC WHEEL

Application filed February 29, 1928, Serial No. 257,869, and in Spain March 26, 1927.

This invention relates to elastic wheels of the kind comprising a central part and a surrounding annular rim connected by radial arms jointed at the one end to the central part and at the other end traversing supports on the annular rim in such manner that the supports can slide relatively to the radial arms, and according to the invention, in such a wheel, pairs of blocks of indiarubber or like resilient material are placed one on each side of the respective radial arms, each of the blocks of each pair being confined within a casing formed by the peripheral and lateral walls of the central part, by the radial arms, and by retention members in such manner that the resilient blocks are supported on the one flank by the side of the arms and on the other flank by the retention members.

The invention is illustrated in the accompanying drawings by way of example.

Figure 1 represents a wheel according to the invention at the left-hand side in front elevation and at the right-hand side in circumferential section.

Figure 2 is a transverse or radial section of Figure 1 taken on the line A—B of Figure 1.

Figure 3 is a section similar to Figure 2, taken on the line A—C of Figure 1.

In carrying the invention into effect it will be understood that the wheel consists of a central part 1 surrounding the hub 2 between the opposed walls of which are jointedly connected by means of bolts 3, which are fitted in the said walls, the radial arms or spokes 4 which pass through the peripheral wall 5 of the central part through holes 6 of a size sufficient to permit of the maximum lateral play. These arms are jointedly connected by means of trunnions 7 to the rim 8 which carries the tyre 9 and are supported laterally within the central part 1 against blocks of indiarubber 10', 10'. The trunnions 7 comprise spherical elements which are diametrically bored for the passage of the arms or spokes 4, the said elements being confined between cups 13 carried by the lateral wall of the rim 8 and correspondingly formed caps 15 secured in position in any suitable manner, as by means of nuts 17 engaging screws 14 passing through lugs 16 upon the said caps and lugs upon the cups 13 and engaging the said lateral wall. The elastic elements are retained by means of retention members indicated at 11' of a form appropriate to the elastic elements. Between the peripheral wall of the central part 1 and the internal peripheral face of the rim 8 other blocks of rubber 12' are provided which are fixed to the lateral wall of the rim 8 only. Each block is provided with a metal ferrule 13 through which passes a bolt 14 fixed to the lateral wall of the rim 8.

As shown in Figure 1, the bolts 3 are advantageously provided with central borings having radial outlets for the purpose of permitting lubrication of the pivotal points of the arms or spokes 4.

It will be understood that under road shock the wheel rim 8 by reason of the arms 4 will have its axis moved out of alignment with the axis of the wheel axle and of the central part 1 of the wheel; the radial arms 4 will consequently move from their radial position and will be inclined to one side or to the other, and the adjacent block of indiarubber 10' will thereupon immediately tend to cause each radial arm to resume the radial position. At the same time the movement of the rim 8 towards the outer periphery of the central part 1 will cause the compression of one of the blocks of indiarubber 12' which will ensure the return of the rim to the concentric position.

It will be understood that the form and dimensions of the respective parts as well as the material of which they are produced may be varied within the scope of the appended claims, and that the wheel rim may be adapted for the reception of a pneumatic, solid elastic or other tyre, and that the wheels may be adapted in form and dimension to vehicles of all kinds.

I claim:—

1. An elastic wheel comprising a central part having a peripheral wall, a surrounding annular rim, radial arms pivotally connected at the inner extremities within the central part and passing with clearance through the peripheral wall thereon, trunnions in the annular rim through which the other extremities of the radial arms pass, cushions of resilient material disposed between the peripheral wall of the central part and the annular rim in fixed positions between the radial arms, blocks of resilient material disposed in the central part against the peripheral wall on either side of the radial arms, and retention members secured to the central part and forming with the peripheral wall thereof means for the retention in position of the resilient blocks.

2. An elastic wheel comprising a central part having a peripheral wall and lateral walls, a surrounding annular rim, radial arms pivotally connected at the inner extremities within the central part and passing with clearance through the peripheral wall thereof, trunnions in the annular rim through which the other extremities of the radial arms pass, cushions of resilient material disposed between the peripheral wall of the central part and the annular rim in fixed positions between the radial arms, blocks of resilient material disposed on each side of the radial arms, and retention members to maintain the said blocks in position, each of the said blocks being disposed in a casing formed by the peripheral wall of the central part, by a radial arm, and by the corresponding retention member and by the lateral walls of the central part in such manner that the resilient blocks receive support on one side from the corresponding radial arm and on the other side from the corresponding retention member.

TEODORO SANMARTI.